United States Patent [19]
Okada

[11] Patent Number: 5,425,096
[45] Date of Patent: Jun. 13, 1995

[54] COMMUNICATION DEVICE

[75] Inventor: Masaaki Okada, Yokohama, Japan

[73] Assignee: Canon Kabushiki Kaisha, Tokyo, Japan

[21] Appl. No.: 884,175

[22] Filed: May 18, 1992

[30] Foreign Application Priority Data

May 28, 1991 [JP] Japan .................. 3-123726

[51] Int. Cl.6 ............................... H04M 1/00
[52] U.S. Cl. ....................... 379/362; 379/355; 379/353; 379/387; 379/280; 379/281
[58] Field of Search ............... 379/355, 362, 353, 280, 379/387, 281, 350, 377

[56] References Cited

U.S. PATENT DOCUMENTS

| | | | |
|---|---|---|---|
| 4,087,649 | 5/1978 | Kerman et al. | 379/362 |
| 4,286,120 | 8/1981 | Sublette | 379/362 |
| 4,564,726 | 1/1986 | Ibata | 379/362 |
| 5,121,425 | 6/1992 | Reichelt | 379/362 |
| 5,157,720 | 10/1992 | Fox | 379/355 |

Primary Examiner—James L. Dwyer
Assistant Examiner—J. M. Saint-Surin
Attorney, Agent, or Firm—Fitzpatrick, Cella, Harper & Scinto

[57] ABSTRACT

A circuit for generating dial pulses and a circuit for forming the direct current loop of a line have conventionally been made up of relays and a coil. In the present invention, these circuits are made up of components, such as capacitors and a semiconductor switching element, to render a network control unit smaller. A compensating circuit is provided for reducing the distortion (caused by the capacitor in the DC loop) of the waveforms of dial pulses and rise waveforms of a direct current when the direct current loop is formed.

20 Claims, 7 Drawing Sheets

FLOWCHART SHOWING CONTROL OF SHAPING RISE WAVEFORM OF DC LOOP DURING OFF-HOOK MODE

COMMUNICATION DEVICE

BACKGROUND OF THE INVENTION

1. Field of the Invention

The present invention relates to a communication device and, more particularly, to a communication device having a Network Control Unit (NCU) for forming dial pulses and the DC loop of a communication line (the closure of a direct current).

2. Description of the Related Art

A conventional NCU utilizes relays to form dial pulses and coils for closure of a direct current.

The conventional NCU will be described with reference to FIG. 7. As shown in this drawing, a P relay is turned on and off to generate dial pulses. However, the waveforms of the dial pulses are distorted because of the electromagnetic induction of a coil L for closure of the DC loop. To compensate for such distortion, an S relay is used, and is turned on only when the dial pulses are generated, at which time the direct current will not flow through the coil L.

To closure the direct current, the DC loop between a telephone set and a switching system must be correctly formed when a relay switches the DC loop from the telephone set side to a facsimile device side. The coil L forms the DC loop made up of the telephone set and the switching system.

However, the above conventional art utilizes relays and a coil, each of which is a relatively high-cost component and is larger than a semiconductor component, thus increasing the cost and size of the NCU.

To solve such a problem, it is possible to construct an NCU using semiconductor elements. In such an NCU, however, the waveforms of the DC loop and dial pulses are distorted during an off-hook mode.

SUMMARY OF THE INVENTION

In view of the above problems, an object of the present invention is to provide an improved communication device.

Another object of this invention is to provide a communication device in which the structure of a network control unit is simplified.

A further object is to provide a communication device employing semiconductor elements to simplify the structure of a network control unit. A further object is to solve the problem of waveforms being distorted, which occurs when the semiconductor elements are employed.

Other objects, features and advantages of this invention will become more fully apparent from the following detailed description of a preferred embodiment taken in connection with the accompanying drawings.

DESCRIPTION OF THE PREFERRED EMBODIMENT

The preferred embodiment of the present invention will be described below with reference to the drawings.

Although this invention applies to and is described with respect to a facsimile type of communication device, it may equally be applied to other types of communication devices connected to telephone lines, such as telex and teletex devices.

Figure 1:
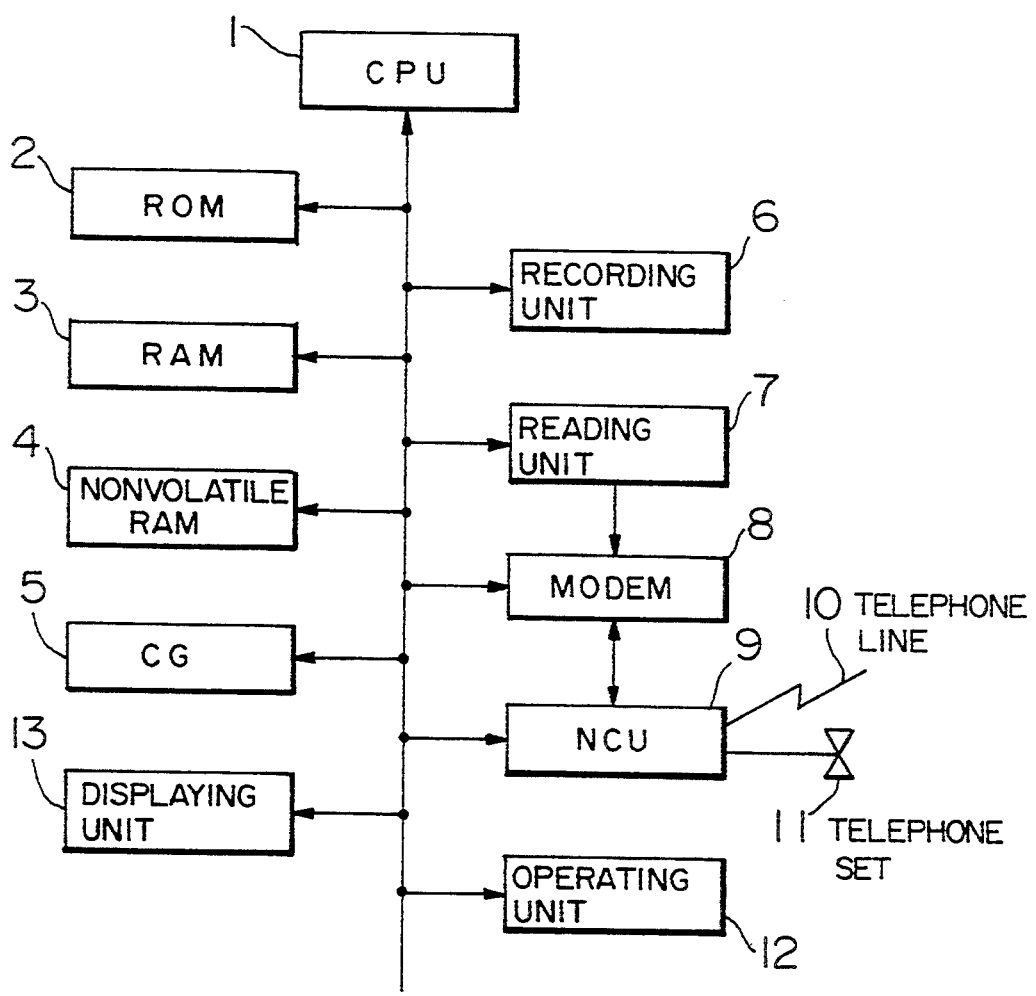
FIG. 1 is a view showing the structure of a preferred embodiment of a facsimile device according to the present invention.

FIG. 1 is a view showing the structure of a facsimile device in accordance with this embodiment.

A central processing unit (CPU) 1 is composed of, for example, a microprocessor, and controls the entire facsimile device in accordance with programs stored in a Read Only Memory (ROM) 2.

A Random Access Memory (RAM) 3 stores binarized image data read by a reading unit 7 and analog waveforms in the form of binary data, etc. The waveforms are input through a telephone line 10 and a Network Control Unit (NCU) 9 and demodulated by a modem 8.

A nonvolatile RAM 4 reliably stores data which must be retained, even when the facsimile device is turned off.

A CG 5 is a ROM for storing font data in the form of character codes, such as Japanese Industrial Standards (JIS) codes and American Standard Code for Information Interchange (ASCII) codes.

A recording unit 6 records data stored in the RAM 3 and outputs it in the form of hard copies.

A reading unit 7 binarizes data which has been read by using a solid state imaging element (CCD), and successively transmits the binary data to the RAM 3. A manuscript sensor is capable of detecting the number of manuscripts placed on the reading unit 7, and a manuscript detecting signal is input to the CPU 1.

The modem 8 modulates data stored in and transmitted from the RAM 3, on the basis of the control of the CPU 1, and outputs it to the telephone line 10 via the NCU 9. It receives an analog signal transmitted through the telephone line 10 by way of the NCU 9, and demodulates it into binary data which is stored in the RAM 3.

The NCU 9 switches the telephone line 10 to either the modem 8 or a telephone set 11, whereby the telephone line 10 is connected to one of such components.

The telephone set 11 is made up of components, such as a handset, a dial and a speech network.

An operating unit 12 is composed of a mode selection key, a key for starting to send or receive images, a ten-key pad for dialing, etc. The mode selection key is used for specifying operation modes when images are sent or received, such as a fine mode, a standard mode or an automatic reception mode. The CPU 1 detects whether any keys are depressed and, if so, which keys are depressed, and controls the above components in accordance with such detection.

A displaying unit 13 is a liquid crystal display device capable of displaying, on the basis of the control of the CPU 1, representations like characters in 16 digits.

This embodiment will now be described in more detail.

Figure 2:
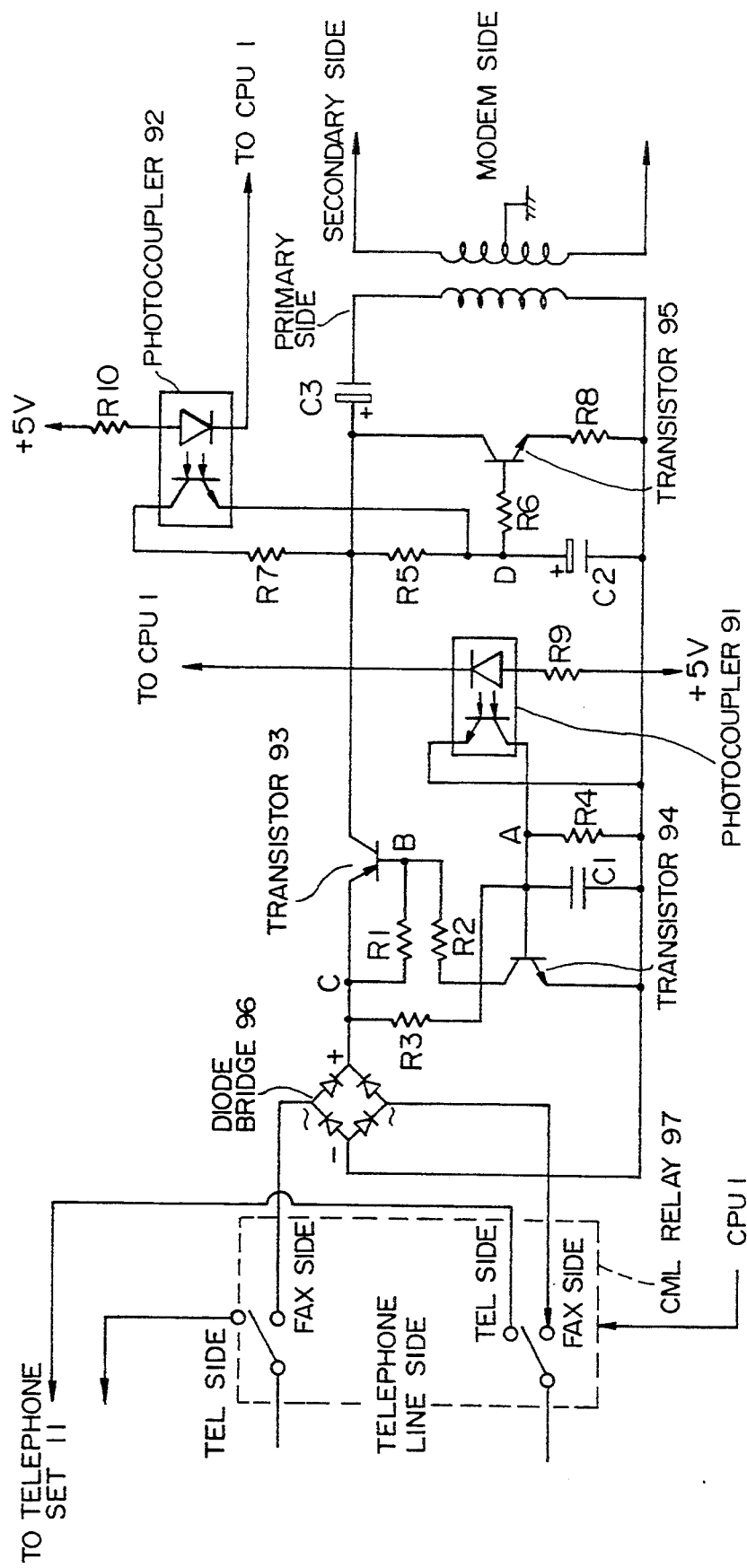
FIG. 2 is a circuit diagram based on that embodiment.

FIG. 2 shows the circuitry of the NCU 9 which is formed of semiconductor components instead of the relays and coil employed conventionally.

Figure 3:
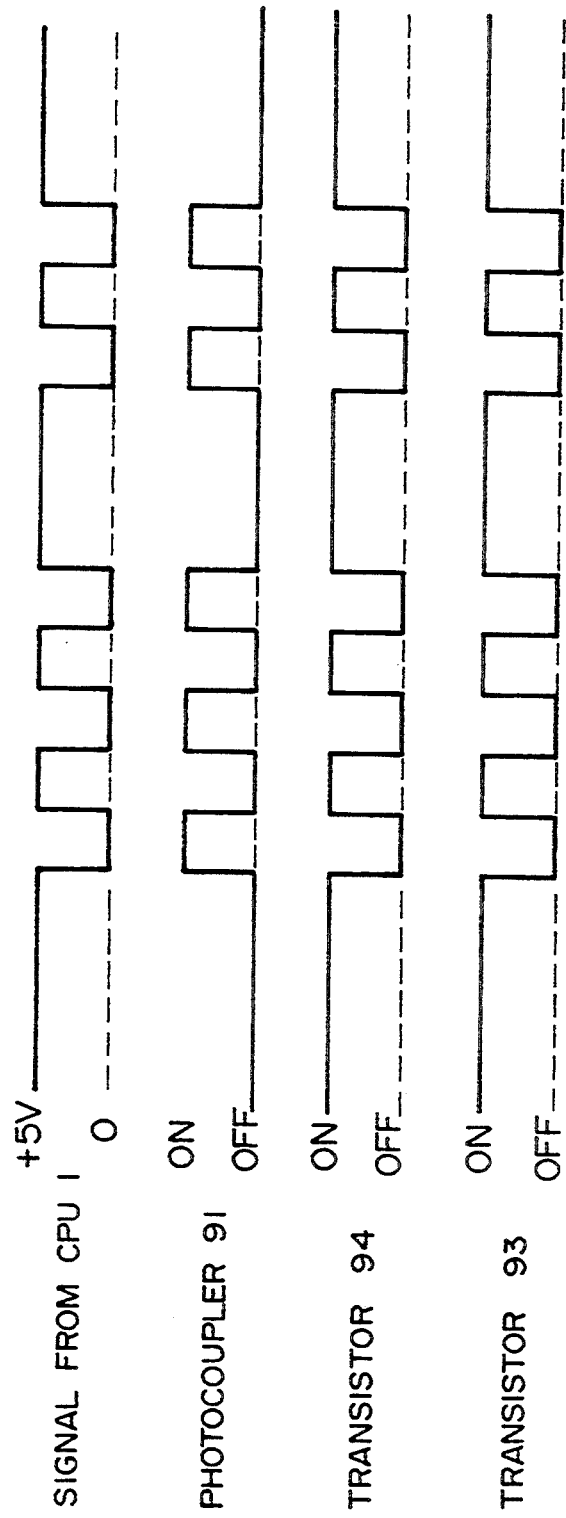
FIG. 3 is a timing chart showing when a dial pulse is formed.

A signal transmitted from the CPU 1 turns a photocoupler 91 on and off, which turns transistors 94 and 93 on and off, whereby a dial pulse is formed. More specifically, when the signal from the CPU 1 has a low voltage of zero, an electric current flows toward the diode side of the photocoupler 91, thus turning the photocoupler 91 on, and the electric potential of point A falls to a ground level. The transistor 94 is turned off, thus stopping the electric current from flowing to resistors R1 and R2. The electric potential of point B becomes equal to the level of a voltage applied through the telephone line. In other words, the electric potential of point B is equal to that of point C. The transistor 93 is turned off, thus cutting off the DC loop. When the signal from the CPU 1 has a high voltage of 5, the photocoupler 91 is turned off. The electric potential of point A becomes equal to the level of a voltage being applied to a resistor R4, thus turning the transistor 94 on. The electric potential of point B falls below that of point C. The transistor 93 is turned on, and the DC loop remains closed. FIG. 3 is a chart showing the timing for the operations mentioned above. The two transistors 93 and 94 are utilized so as to smoothly control the electric current. (The transistor 94 serves to drive the base current of the transistor 93.)

A transistor 95 in the circuitry shown in FIG. 2 is utilized in place of a coil for retaining the DC loop. When a direct current is closured, the electric current flows to resistors R5 and R6, thus charging a capacitor C2. The electric potential of a point D assumes a uniform value, and the transistor 95 remains on. The DC loop is thereby closed. The level of the electric current depends upon the resistance values of the resistors of the transistors 93 and 95, and a diode bridge 96 when these components are turned on. The resistance values of the resistors must be great enough to maintain the level of the electric current of the DC loop.

As described previously, the rise waveform of the DC loop is distorted when the DC loop is formed, due to the effect of the capacitor C2. The resistor R5 shown in FIG. 2 has a significantly large capacitance to increase the impedance. Because of this capacitance, the speed at which the capacitor C2 is charged is slowed down, having an effect on the waveform of the direct current. A photocoupler 92 is employed to compensate for this trouble. The speed of charging the capacitor C2 is increased by turning the photocoupler 92 on. Thus, the capacitor C2 causes less distortion. (The capacitance of the resistor R5 is larger than that of a resistor R7.)

If the photocoupler 92 is turned on immediately before the closure of the direct current, the rise waveform of the DC loop will not be distorted. After the DC loop has been closed and the capacitor C2 has been charged, the photocoupler 92 is turned off. If the photocoupler 92 remained on, the impedance on a primary side would decrease and would not match an impedance of 600 Ω on the secondary side.

Figure 4:
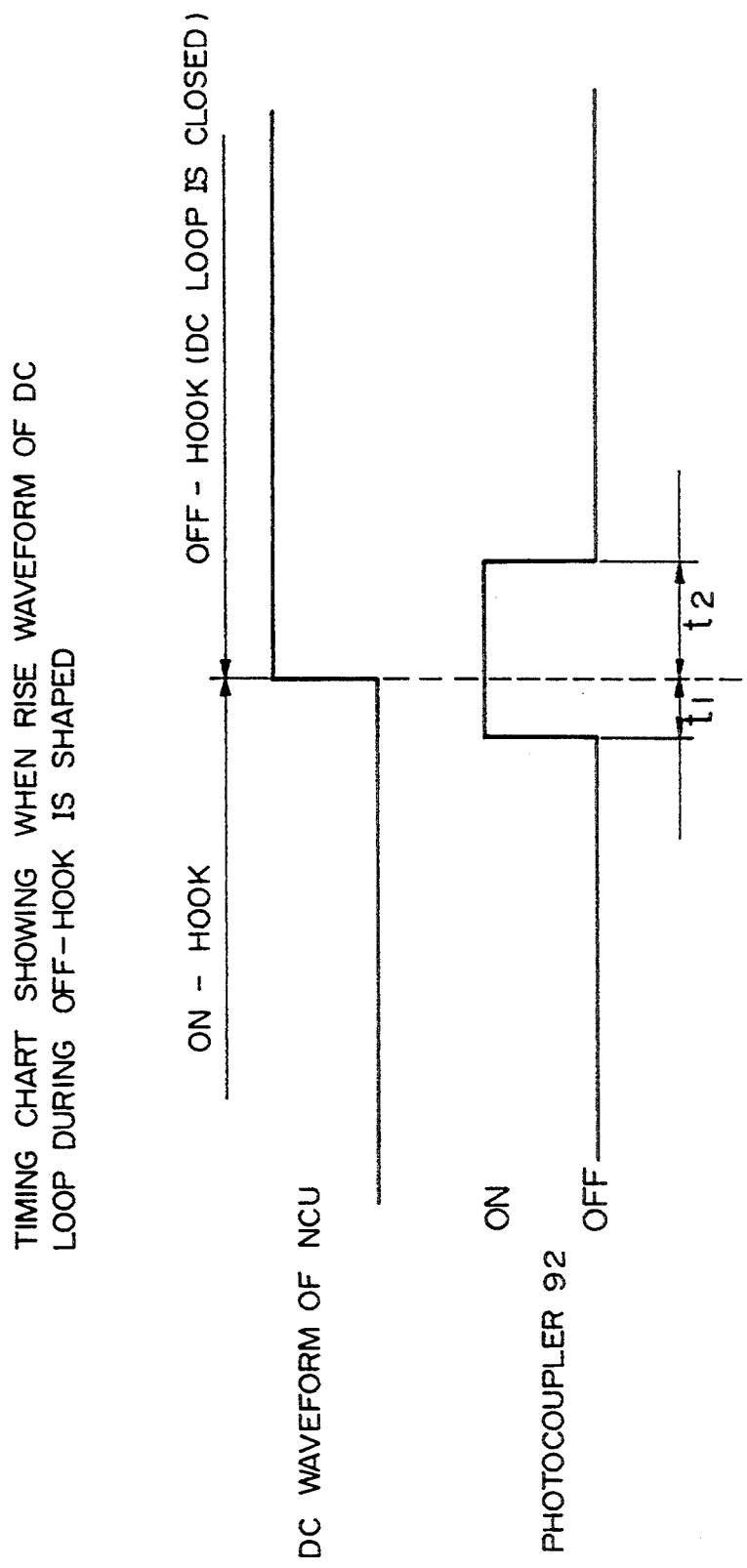
FIG. 4 is a timing chart showing when the rise waveform of a DC loop is shaped during an off-hook mode.
Figure 5:
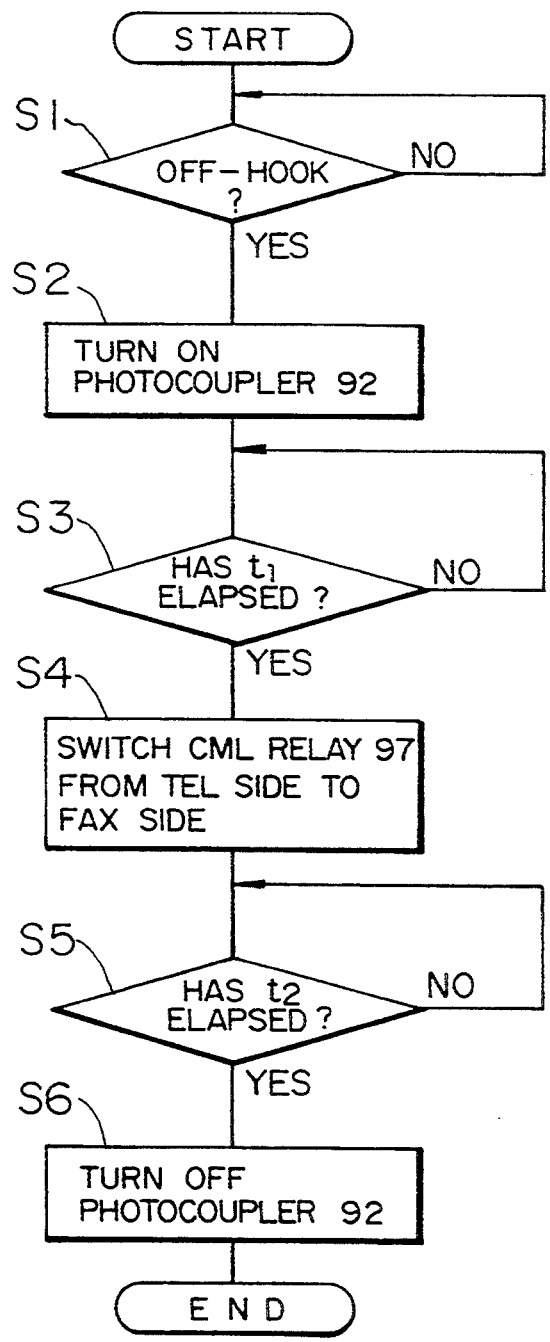
FIG. 5 is a flowchart showing the control of shaping the rise waveform of the DC loop during the off-hook mode.

FIG. 4 is a chart showing the timing for the operations mentioned above. The amount of time $t_1$ shown in FIG. 4 may be increased as much as possible as long as the photocoupler 92 is turned on before the closure of the direct current. Time $t_2$ is the amount of time required to charge the capacitor C2 completely. FIG. 5 is a flowchart showing the control of shaping the rise waveform of the direct current in the DC loop during an off-hook mode.

In step S1, a determination is made whether the off-hook mode is indicated by detecting a call signal or whether unillustrated keys of the operating unit 12 are depressed. Specifically, a determination is made whether the call signal transmitted through the line is detected or whether an off-hook key, a simplified dialing key or pushbutton digits are depressed. If the off-hook mode is indicated, the photocoupler 92 is turned on in step S2. In step S3, a determination is made whether time $t_1$ has elapsed since the photocoupler 92 was turned on. If it has elapsed, in step S4 a CML relay 97 is switched from the side of the telephone set 11 to the side of the facsimile device. In step S5, a determination is made whether time $t_2$ has elapsed since the CML relay 97 was switched. If $t_2$ has elapsed, the photocoupler 92 is turned off in step S6.

Figure 6:
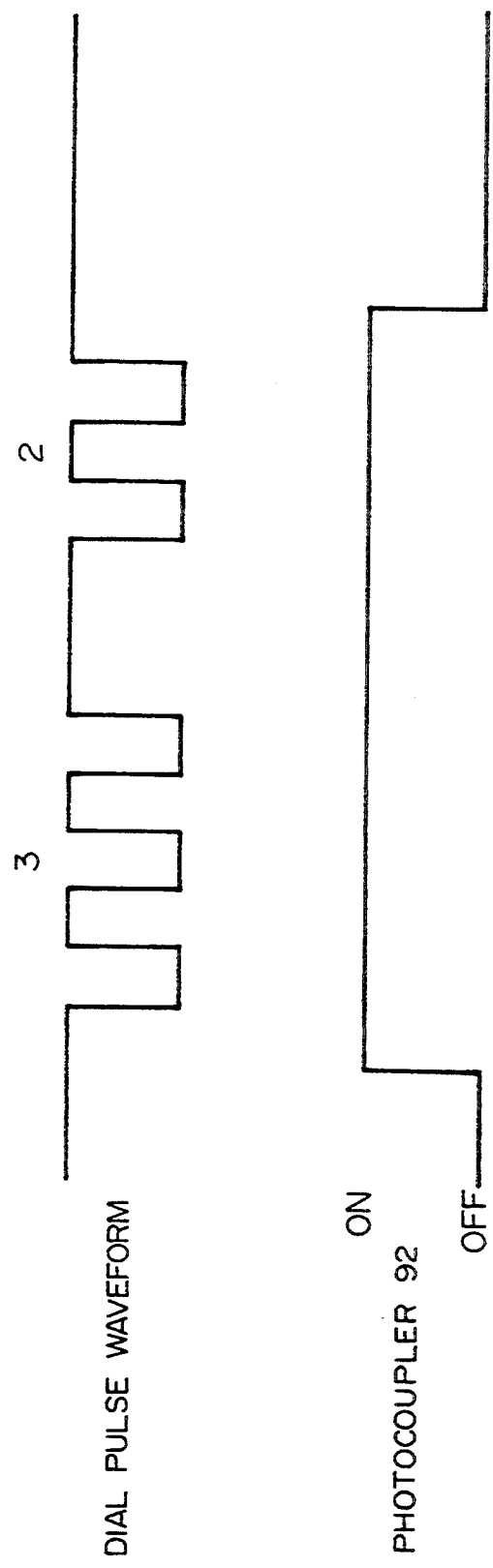
FIG. 6 is a timing chart showing when the waveform is compensated on the occurrence of the dial pulse.
Figure 7:
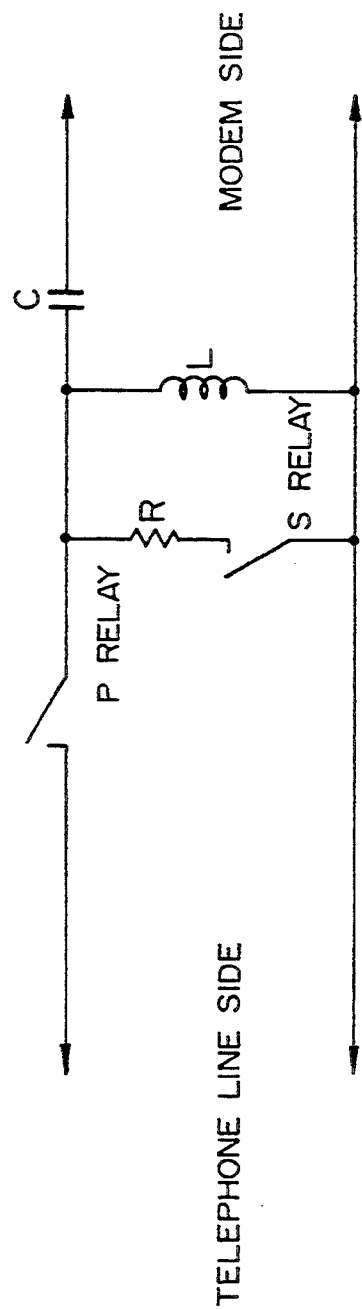
FIG. 7 is a circuit diagram of the conventional art.

When the DC loop is formed and then dialing (calling) is performed, as shown in the timing chart of FIG. 6, the CPU 1 first turns the photocoupler 92 on, and then turns the photocoupler 91 on and off in accordance with dial data. This is because when the dial pulse is generated, the capacitor C2 has an effect on the waveform of the dial pulse. Therefore, the photocoupler 92 compensates for such an effect. When all dial data have been completely transmitted, the photocoupler 92 is turned off, thus completing the call.

As has been described above, in the conventional art, the portions of an NCU which are used for forming the DC loop and dial pulses are composed of relays and a coil. However, in the present invention, these portions are composed of semiconductor elements. This makes it possible to reduce the cost of the NCU circuitry and to render it smaller than the conventional NCU. With the NCU using the semiconductor elements, it is possible to decrease the distortion of the waveforms of the direct current and dial pulse by controlling a compensating circuit for wave distortion through software immediately before the direct current is closured and the dial pulse is generated.

The present invention may be applied not only to facsimile devices but also to other types of communication devices, such as telephone sets and telex devices.

This invention is not limited to the preferred embodiment described above, and various modifications can be made thereto.

What is claimed is:

1. A communication device comprising:
   first circuitry for forming a direct current loop of a communication line, said first circuitry comprising a semiconductor element;
   second circuitry for generating a dial pulse, said second circuitry comprising a semiconductor element;
   compensating circuitry for reducing distortion of a waveform of the direct current loop; and
   driving means for driving said compensating circuitry selectively during at least the generation of the dial pulse by the second circuitry.

2. A communication device according to claim 1, wherein said compensating circuitry is one circuit for reducing the distortion of the waveform of the dial pulse and the rise waveform of the direct current when the direct current loop is formed.

3. A communication device according to claim 1, wherein said first circuitry includes a transistor for forming the direct current loop and a capacitor for turning said transistor on, said compensating circuitry being a circuit for temporarily increasing the speed at which said capacitor is charged.

4. A communication device according to claim 3, wherein said capacitor in said first circuitry is connected in series to a first transistor of high impedance, said element and a second resistor of low impedance connected in parallel with the first resistor.

5. A communication device comprising a network control unit for forming a direct current loop of a communication line,
said network control unit including:
a semiconductor switching element for forming the direct current loop;
a capacitor for turning said semiconductor switching element on; and
compensating circuitry for temporarily increasing, when the direct current loop is formed, a rate at which said capacitor is charged, until said capacitor is completely charged.

6. A communication device according to claim 5, wherein said capacitor is connected in series to a first resistor of high impedance, said compensating circuitry being composed of the semiconductor switching element and a second resistor of low impedance connected in parallel with the first resistor.

7. A communication device according to claim 5, wherein said network control unit further includes circuitry for generating a dial pulse, said circuitry being composed of the semiconductor switching element.

8. A network control unit comprising:
a semiconductor switching element for forming a direct current loop of a communication line;
a capacitor for turning said semiconductor switching element on; and
compensating circuitry for temporarily increasing, when the direct current loop is formed, a rate at which said capacitor is charged, until said capacitor is completely charged.

9. A network control unit according to claim 8, wherein said capacitor is connected in series to a first resistor of high impedance, said compensating circuitry being composed of the switching element and a second resistor of low impedance connected in parallel to the first resistor.

10. A network control unit according to claim 8 further comprising circuitry for generating a dial pulse, said circuitry being composed of the semiconductor switching element.

11. A network control unit according to claim 8, wherein said compensating circuitry increases the speed during a generation of a dial pulse.

12. A network control unit according to claim 8, wherein said compensating circuitry increases the speed during a formation operation of the direct current loop of the line by said semiconductor switching element.

13. A network control unit according to claim 8, further comprising second capacitor for connecting a data communication unit.

14. A communication device according to claim 5, wherein said compensating circuitry increases the speed during a generation of a dial pulse.

15. A communication device according to claim 5, wherein said compensating circuitry increases the speed during a formation operation of the direct current loop of the line by said semiconductor switching element.

16. A communication device according to claim 5, further comprising second capacitor for connecting a data communication unit.

17. A network control unit comprising:
forming means, connected across a pair of communication lines, for forming a loop between the pair of communication lines; and
providing means, including capacitor means and resistor means being connected with said capacitor means in serial and having a resistor value which decides a rate at which said capacitor means is charged, said providing means being connected across the pair of communication lines, for providing a switching signal, for changing the resistor value of said resistor means to said forming means;
wherein said forming means includes means for changing the resistor value in accordance with the switching signal.

18. A network control unit according to claim 17, wherein said resistor means changes the resistor value during first predetermined duration before the loop forming operation and second predetermined duration after the loop forming operation.

19. A network control unit according to claim 17, further comprising second capacitor means for connecting a data communication unit.

20. A network control unit according to claim 17, wherein said resistor means are first resistor and second resistor, said second resistor is selectively connected during the loop forming operation by said forming means.

* * * * *

UNITED STATES PATENT AND TRADEMARK OFFICE
CERTIFICATE OF CORRECTION

PATENT NO. : 5,425,096

DATED : June 13, 1995

INVENTOR(S) : MASAAKI OKADA

It is certified that error appears in the above-identified patent and that said Letters Patent is hereby corrected as shown below:

COLUMN 5

Line 4, "said element" should read --said compensating circuitry being composed of a switching element--.
Line 46, "claim 8" should read --claim 8,--.

Signed and Sealed this

Tenth Day of October, 1995

Attest:

BRUCE LEHMAN

Attesting Officer

Commissioner of Patents and Trademarks